US008774774B2

(12) United States Patent
Lee et al.

(10) Patent No.: US 8,774,774 B2
(45) Date of Patent: Jul. 8, 2014

(54) METHOD FOR TRANSMITTING DIGITAL DATA AND SYSTEM THEREOF AND MOBILE TERMINAL FOR THE SAME IN CALL WAITING

(75) Inventors: Seok Keon Lee, Gyeonggi-do (KR); Hyun Wook Kim, Gyeonggi-do (KR); Oh Chan Kwon, Incheon (KR); Joong Gunn Park, Gyeonggi-do (KR)

(73) Assignee: SK Telecom Co., Ltd. (KR)

( * ) Notice: Subject to any disclaimer, the term of this patent is extended or adjusted under 35 U.S.C. 154(b) by 359 days.

(21) Appl. No.: 13/203,676

(22) PCT Filed: Sep. 4, 2009

(86) PCT No.: PCT/KR2009/004989
§ 371 (c)(1),
(2), (4) Date: Sep. 29, 2011

(87) PCT Pub. No.: WO2010/098523
PCT Pub. Date: Sep. 2, 2010

(65) Prior Publication Data
US 2012/0034907 A1 Feb. 9, 2012

(30) Foreign Application Priority Data
Feb. 26, 2009 (KR) .................. 10-2009-0016290

(51) Int. Cl.
*H04M 3/42* (2006.01)
(52) U.S. Cl.
USPC ......... 455/414.1; 455/417; 370/352; 434/236
(58) Field of Classification Search
USPC .......... 455/455, 434, 414.1, 417; 379/215.01, 379/88.13, 265.01, 396, 309; 345/10; 342/352; 370/352; 434/236
See application file for complete search history.

(56) References Cited

U.S. PATENT DOCUMENTS 5,880,731 A * 3/1999 Liles et al. .................... 715/758
7,929,681 B2 * 4/2011 Henry ...................... 379/218.01
(Continued)

FOREIGN PATENT DOCUMENTS

KR 1020040094271 11/2004
KR 1020050036355 4/2005
(Continued)

OTHER PUBLICATIONS

Sang-Deok Kim, (KR Patent Application # 10-2004-0094271), Image data service offered apparatus and method in the waiting for calling answer, Nov. 9, 2004, All pages.*

*Primary Examiner* — Mahendra Patel

(57) ABSTRACT

The present invention relates to a method and system for transmitting digital data while waiting for call connection and a mobile communication terminal for the same. If an originating mobile communication terminal attempts call connection, the mobile communication system searches for service subscription information of a terminating mobile communication terminal and confirms whether or not the terminating mobile communication terminal is a subscriber of a data transmission service. If the terminating mobile communication terminal is a subscriber of the data transmission service, the mobile communication system requests and receives call connection waiting information containing a plurality of digital data and matching to the terminating mobile communication terminal from a connection information providing server, and encodes and transmits the call connection waiting information to the originating mobile communication terminal. Therefore, digital data can be transmitted to the mobile communication terminal while connecting a call without separately using an additional protocol.

17 Claims, 8 Drawing Sheets

(56) References Cited

U.S. PATENT DOCUMENTS

2006/0073817 A1* 4/2006 Lee .................................. 455/417
2007/0127663 A1   6/2007 Bae et al.
2007/0224973 A1   9/2007 Park et al.
2007/0230681 A1* 10/2007 Boyer et al. ................ 379/265.1
2008/0165939 A1*  7/2008 Kovales et al. ............ 379/88.22

FOREIGN PATENT DOCUMENTS

| KR | 1020050049229 | 5/2005 |
| KR | 100814907 | 3/2008 |
| WO | 2005/043926 | 5/2005 |

* cited by examiner

METHOD FOR TRANSMITTING DIGITAL DATA AND SYSTEM THEREOF AND MOBILE TERMINAL FOR THE SAME IN CALL WAITING

TECHNICAL FIELD

The present invention relates to a method and system for transmitting digital data while waiting for call connection and a mobile communication terminal for the same, and more specifically, to a method and system for providing call connection waiting information containing a plurality of digital data while connecting a call and a mobile communication terminal for the same, in which the digital data can be transmitted to the mobile communication terminal while connecting a call without separately using an additional protocol.

BACKGROUND ART

Recently, call connection tone services are spotlighted, in which various sounds specified by a terminating terminal user can be heard through a mobile communication terminal or a landline phone of an originating terminal user while the originating terminal user attempts a call. The call connection tone service is also referred to as a ring back tone (RBT) service or a coloring RBT (CRBT) service. Such a call connection tone is a concept of a service for providing an originating mobile communication terminal user with a sound specified by a terminating mobile communication terminal user. It is a service allowing sounds of bird chirping, sounds of running water, and even previously recorded user's voices, as well as latest folk songs and popular songs, to be used as a call connection tone, in stead of a beep sound, which is a mechanical call connection tone generated in a conventional call. Owing to such call connection tone services, the originating mobile communication terminal user hears a sound out of a sound source specified by the terminating mobile communication terminal user, in stead of hearing monotonous mechanical call connection tones, and feels auditory satisfaction.

In addition, since services for providing multimedia moving images, advertisements, and the like, as well as music substituting for the beep sound, in the form of images are introduced, users may feel visual amusement, in addition to the auditory satisfaction.

However, since the call connection tone is recognized as a means for expressing user's personality or emotion, as well as easing tediousness while waiting for call connection, it is required to develop a new service that uses a sense of touch, a sense of smell, temperature, and the like, as well as a sense of sight and a sense of hearing, as a call connection tone.

DISCLOSURE OF INVENTION

Technical Problem

Therefore, the present invention has been made in view of the above problems, and it is an object of the present invention to provide a method and system for transmitting digital data while waiting for call connection and a mobile communication terminal for the same, in which the mobile communication terminal can be provided with call connection waiting information containing various types of information while connecting a call without separately using an additional protocol.

Another object of the present invention is to transmit various types of information, such as vibration, a color and the like, as well as voices, to the mobile communication terminal in the form of digital data while connecting a call.

Another object of the present invention is to provide an originating mobile communication terminal user with emotional information call connection waiting information set by a terminating mobile communication terminal user when the originating mobile communication terminal user attempts call connection to the terminating mobile communication terminal user who has set the emotional information call connection waiting information.

Another object of the present invention is to provide vibration, temperature, scent and the like, as well as music or images, as a call connection tone so that the terminating mobile communication terminal user may express personality or emotion and feel pleasure of expression, thereby attracting interest of the originating mobile communication terminal user.

Another object of the present invention is to pursue personality of the terminating mobile communication terminal user, vitalize industries of developing various types of emotional information call connection waiting information which satisfies desire of expression, and induce expansion of a market distributing the emotional information call connection waiting information.

Technical Solution

To accomplish the above objects, according to one aspect of the present invention, there is provided a data transmission system comprising: a mobile communication system for searching for service subscription information of a terminating mobile communication terminal and confirming whether or not the terminating mobile communication terminal is a subscriber of a data transmission service, if an originating mobile communication terminal attempts call connection, and requesting and receiving call connection waiting information containing a plurality of digital data and matching to the terminating mobile communication terminal from a connection information providing server and encoding and transmitting the call connection waiting information to the originating mobile communication terminal, if the terminating mobile communication terminal is a subscriber of the data transmission service; the connection information providing server for storing and managing the call connection waiting information containing a plurality of data, and extracting and providing corresponding call connection waiting information in response to a request from the mobile communication system; and a mobile communication terminal for receiving the call connection waiting information transmitted from the mobile communication system, analyzing the call connection waiting information, dividing the plurality of data, and processing each of the divided data.

The mobile communication system includes: a call connection processing server for requesting a subscriber information providing server to search for service subscription information of the terminating mobile communication terminal to which the originating mobile communication terminal attempts call connection and confirming whether or not the terminating mobile communication terminal is a subscriber of a data transmission service, if the originating mobile communication terminal attempts the call connection, and requesting and receiving call connection waiting information matching to the terminating mobile communication terminal from the connection information providing server and encoding and transmitting the call connection waiting information to the originating mobile communication terminal, if the terminating mobile communication terminal is a subscriber of the data transmission service; and the subscriber information providing server for storing and managing user information including service subscription information, and confirming whether or not the corresponding mobile communication terminal subscribes the data transmission service and transmitting a result of the confirmation to the call connection processing server, if a request for confirming whether or not a specific mobile communication terminal user is a subscriber of the data transmission service is received from the call connection processing server.

If the originating mobile communication terminal attempts voice call connection, the call connection processing server changes a corresponding traffic class to allow transmission of the call connection waiting information containing a plurality of data, and if transmission of the call connection waiting information is completed, the call connection processing server preferably returns to a previous state to continue transmitting voices.

According to another aspect of the present invention, there is provided a mobile communication terminal connected to a mobile communication system, for receiving and processing call connection waiting information transmitted from the mobile communication system while connecting a call, the mobile communication terminal comprising: a decoder for confirming whether or not a preset identification code indicating that the call connection waiting information contains a plurality of data is contained in a header of a file format, if the call connection waiting information is received from the mobile communication system, and decoding the call connection waiting information and transferring the decoded call connection waiting information to a file analyzing unit, if the identification code is contained in the header as a result of the confirmation; the file analyzing unit for analyzing the file format of the call connection waiting information transmitted from the decoder, dividing the call connection waiting information into a plurality of data, and transfers the data to the data processing unit to implement the data on the mobile communication terminal; and a data processing unit for processing the call connection waiting information divided into a plurality of individual data and transmitted from the file analyzing unit, on a basis of corresponding individual data.

If the call connection waiting information contains a plurality of data, the call connection waiting information preferably contains a mixed mode field containing a code specifying a type and number of the contained data, a header field containing identification information of real data for identifying each of the plurality of real data, and a real data field containing real data.

The call connection waiting information preferably further contains a codec header field that is added when the mobile communication system performs encoding based on a specific codec.

The codec is preferably a speech codec having a variable speed.

According to another aspect of the present invention, there is provided a method for executing call connection waiting information in a mobile communication terminal connected to a mobile communication system, the method comprising the steps of: a) allowing the mobile communication terminal to receive the call connection waiting information transmitted from the mobile communication system, when the mobile communication terminal attempts call connection; b) allowing the mobile communication terminal to examine a header of a file format of the call connection waiting information and confirm whether or not a preset identification code indicating that the call connection waiting information contains a plurality of data is contained in the header; c) allowing the mobile communication terminal to decode the call connection waiting information, analyze the file format of the decoded call connection waiting information, and divide the call connection waiting information into a plurality of data, if the identification code is contained in the header as a result of the confirmation; and d) allowing the mobile communication terminal to process the call connection waiting information divided into a plurality of individual data, on a basis of corresponding individual data.

If the call connection waiting information contains a plurality of data, the call connection waiting information contains a mixed mode field containing a code specifying a type and number of the contained data, a header field containing identification information of real data for identifying each of the plurality of real data, and a real data field containing real data, and in step c), the mobile communication terminal preferably divides the plurality of data into individual data referring to contents of the header field.

The call connection waiting information further contains a codec header field that is added when the mobile communication system performs encoding based on a specific codec, and in step b), the mobile communication terminal preferably confirms whether or not the preset identification code indicating that the call connection waiting information contains a plurality of data is contained in the header referring to the contents of the codec header field.

According to another aspect of the present invention, there is provided a connection information providing server comprising: a transmit and receive unit for communicating with an originating call controller; an emotional information contents DB for storing a plurality of emotional information call connection waiting information contents; and a control unit for receiving emotional information call connection waiting information that can be supported by an originating mobile communication terminal and information on an emotional information call connection waiting information service subscribed by a terminating mobile communication terminal through the transmit and receive unit, comparing the received emotional information call connection waiting information and information on an emotional information call connection waiting information service, extracting contents of the emotional information call connection waiting information that can be supported by the originating mobile communication terminal from the emotional information contents DB through the comparison, and transmitting the extracted contents to the originating call controller through the transmit and receive unit.

The emotional information contents DB preferably includes a vibration contents DB for storing vibration emotional information contents, a temperature contents DB for storing temperature emotional information contents, and a smell contents DB for storing smell emotional information contents.

The originating call controller preferably includes: a call controller transmit and receive unit for communicating with the originating mobile communication terminal, an originating location register, a connection information providing server, and a terminating call controller, receiving a call request for attempting call connection with the terminating mobile communication terminal from the originating mobile communication terminal, and transmitting the call request to the terminating call controller; and a call controller control unit for receiving information on the emotional information call connection waiting information service subscribed by the terminating mobile communication terminal from the terminating call controller, requesting and receiving emotional information call connection waiting information that can be supported by the originating mobile communication terminal from the originating location register, transmitting the emotional information call connection waiting information that can be supported by the originating mobile communication terminal and the information on the emotional information call connection waiting information service subscribed by the terminating mobile communication terminal to the connection information providing server through the call controller transmit and receive unit, and transmitting contents of the emotional information call connection waiting information that can be supported by the originating mobile communication terminal received from the connection information providing server through the transmit and receive unit to the originating mobile communication terminal.

The originating mobile communication terminal preferably includes: an input unit for receiving a user's selection signal; a terminal transmit and receive unit for communicating with the originating call controller; an output unit for outputting images and voices received through the terminal transmit and receive unit; a memory unit for storing application programs and data; an emotional information call connection waiting information providing unit for executing emotional information call connection waiting information corresponding to the contents of the emotional information call connection waiting information received through the terminal transmit and receive unit; and a terminal control unit for transmitting a call request for attempting call connection with the terminating mobile communication terminal to the originating call controller through the terminal transmit and receive unit, receiving the emotional information call connection waiting information contents from the originating call controller, and executing emotional information call connection waiting information corresponding to the emotional information call connection waiting information contents received through the terminal transmit and receive unit According to another aspect of the present invention, there is provided a method for providing emotional information call connection waiting information, the method comprising: a receiving step of allowing a connection information providing server to receive information on an emotional information call connection waiting information service subscribed by a terminating mobile communication terminal and emotional information call connection waiting information that can be supported by an originating mobile communication terminal from an originating call controller; a comparing step of allowing the connection information providing server to compare the information on the emotional information call connection waiting information service subscribed by the terminating mobile communication terminal and the emotional information call connection waiting information that can be supported by the originating mobile communication terminal; an extracting step of allowing the connection information providing server to extract contents of the emotional information call connection waiting information that can be supported by the originating mobile communication terminal from an emotional information contents DB through the comparing step; and a transmitting step of allowing the connection information providing server to transmit the extracted emotional information call connection waiting information contents to the originating call controller.

The method for providing emotional information call connection waiting information preferably further comprises a setting step of allowing the connection information providing server to set the emotional information call connection waiting information providing service of the terminating mobile communication terminal, before the receiving step.

The emotional information contents are preferably either a code agreed with the terminating mobile communication terminal in advance or a data containing emotional information.

The transmitting step preferably transmits the emotional information call connection waiting information contents to the originating mobile communication terminal through circuit switching and packet switching.

The transmitting step preferably transmits the emotional information call connection waiting information contents to the originating mobile communication terminal through a message transmitted in a method selected among USSD, UUS, and SMS.

The transmitting step preferably transmits the emotional information call connection waiting information contents to the originating mobile communication terminal through an AMR voice codec containing the emotional information contents.

Advantageous Effects

As describe above, the method and system for transmitting digital data while waiting for call connection and the mobile communication terminal for the same according to the present invention are effective in that the mobile communication terminal can be provided with call connection waiting information containing various types of information while connecting a call without separately using an additional protocol.

The present invention is effective in that various types of information, such as vibration, a color and the like, as well as voices, can be transmitted to the mobile communication terminal in the form of digital data while connecting a call, and thus data reflecting user's emotional information can be delivered when call connection is attempted.

Furthermore, the originating call controller receives emotional information call connection waiting information that can be supported by the originating mobile communication terminal and information on an emotional information call connection waiting information service subscribed by the terminating mobile communication terminal from the originating location register, and transmits the emotional information call connection waiting information and the information on the emotional information call connection waiting information service to the connection information providing server. The connection information providing server compares the emotional information call connection waiting information that can be supported by the originating mobile communication terminal and the information on the emotional information call connection waiting information service subscribed by the terminating mobile communication terminal, extracts contents of the emotional information call connection waiting information that can be supported by the originating mobile communication terminal, and transmits the extracted contents to the originating mobile communication terminal. The originating mobile communication terminal executes emotional information call connection waiting information corresponding to the received emotional information call connection waiting information contents. Therefore, the present invention is advantageous in that user's personality and emotion can be expressed, and interest of the user can be increased.

Furthermore, the present invention is advantageous in that development of various types of emotional information call connection waiting information pursuing personality of a terminating mobile communication terminal user and satis-

MODE FOR CARRYING OUT THE INVENTION

The preferred embodiments of the invention will be hereafter described in detail, with reference to the accompanying drawings.

Figure 1:
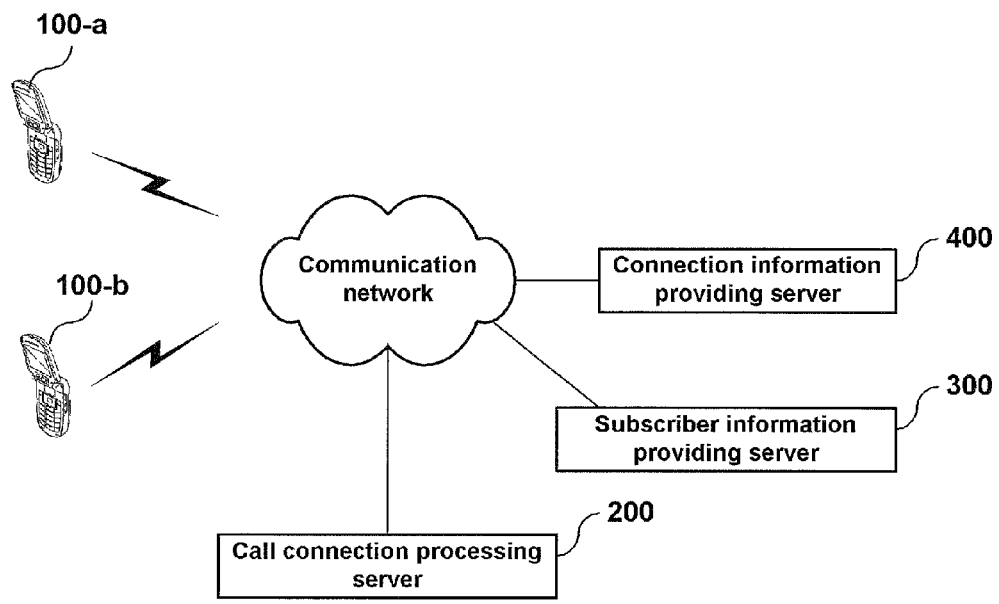
FIG. 1 is a view showing the configuration of a data transmission system according to the present invention.

FIG. 1 is a view showing the configuration of a data transmission system according to the present invention.

As shown in the figure, the data transmission system includes mobile communication terminals 100-*a* and 100-*b*, a mobile communication system including a call connection processing server 200 and a subscriber information providing server 300, and a connection information providing server 400.

Describing in further detail, if an originating mobile communication terminal 100-*a* attempts call connection, the mobile communication system searches for service subscription information of a terminating mobile communication terminal 100-*b* and confirms whether or not the terminating mobile communication terminal is a subscriber of a data transmission service. If the terminating mobile communication terminal is a subscriber of the data transmission service, the mobile communication system requests and receives call connection waiting information containing a plurality of digital data and matching to the terminating mobile communication terminal 100-*b* from the connection information providing server 400, and encodes and transmits the call connection waiting information to the originating mobile communication terminal 100-*a*.

Here, the data transmission service is defined as a service for delivering call connection waiting information containing a plurality of digital data (e.g., voices, vibration, temperature, colors and the like) set by the terminating mobile communication terminal to the originating mobile communication terminal while waiting for call connection. Unlike a conventional call connection tone, the call connection waiting information contains a plurality of digital data respectively having a different character and an additional header for identifying a corresponding digital data within one frame.

If the originating mobile communication terminal 100-*a* attempts call connection, the call connection processing server 200 requests the subscriber information providing server 300 to search for service subscription information of the terminating mobile communication terminal 100-*b* to which the originating mobile communication terminal attempts the call connection and confirms whether or not the terminating mobile communication terminal is a subscriber of the data transmission service. If the terminating mobile communication terminal is a subscriber of the data transmission service, the call connection processing server 200 requests and receives call connection waiting information matching to the terminating mobile communication terminal 100-*b* from the connection information providing server 400, and encodes and transmits the call connection waiting information to the originating mobile communication terminal 100-*a*.

Here, if the originating mobile communication terminal 100-*a* attempts voice call connection, the call connection processing server 200 changes a corresponding traffic class to allow transmission of call connection waiting information containing a plurality of data, and if transmission of the call connection waiting information is completed (e.g., the terminating mobile communication terminal accepts the call), the call connection processing server 200 returns to the previous state (a state for transmitting voices) to continue transmitting voices.

The subscriber information providing server 300 stores and manages user information including service subscription information. If the subscriber information providing server 300 receives a request for confirming whether or not a specific mobile communication terminal user is a subscriber of a data transmission service from the call connection processing server 200, the subscriber information providing server 300 confirms whether or not the corresponding mobile communication terminal subscribes the data transmission service and transmits a result of the confirmation to the call connection processing server 200.

The connection information providing server 400 stores and manages call connection waiting information containing a plurality of data, and extracts and provides corresponding call connection waiting information in response to a request from the mobile communication system.

If the mobile communication terminal 100 receives the call connection waiting information transmitted from the mobile communication system, the mobile communication terminal 100 analyses the call connection waiting information, divides the plurality of data, and processes each of the divided data.

On the other hand, the call connection processing server 200 is configured to perform a function of an exchange that performs call connection between the originating mobile communication terminal and the terminating mobile communication terminal in the mobile communication system, and it is referred to as a call connection processing server so as not to be limited to a specific communication network.

In addition, the subscriber information providing server 300 is configured to perform a function of a home location register that manages and provides various types of information including additional service subscription information of a subscriber in the mobile communication system, and it is referred to as a subscriber information providing server so as not to be limited to a specific communication network.

Figure 2:
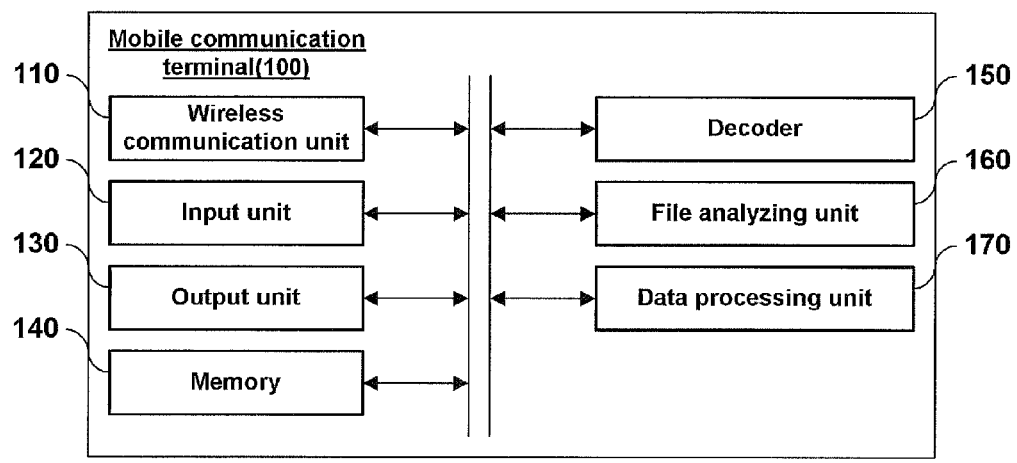
FIG. 2 is a block diagram showing the configuration of a mobile communication terminal according to the present invention.

FIG. 2 is a block diagram showing the configuration of a mobile communication terminal according to the present invention.

As shown in the figure, the mobile communication terminal 100 includes a wireless communication unit 110, an input unit 120, an output unit 130, a memory 140, a decoder 150, a file analyzing unit 160, and a data processing unit 170.

The wireless communication unit 110 for performing communications through a communication network, the input unit 120 for performing input control, the output unit 130 for aurally or visually providing data needed for using a voice communication service or a data service, and the memory 140 for storing information related to the mobile communication terminal have a general configuration, and details thereof will be omitted.

Describing in further detail, if the decoder 150 receives call connection waiting information from the mobile communication system, the decoder 150 confirms whether or not a preset identification code indicating that the call connection waiting information contains a plurality of data is contained in the header of the file format. If the identification code is contained in the header as a result of the confirmation, the decoder 150 decodes the call connection waiting information and transfers the decoded call connection waiting information to the file analyzing unit 160.

The file analyzing unit 160 analyzes the file format of the call connection waiting information transmitted from the decoder 150, divides the call connection waiting information into a plurality of data, and transfers the data to the data processing unit 170 to implement the data on the mobile communication terminal.

The data processing unit 170 processes the call connection waiting information divided into a plurality of individual data and transmitted from the file analyzing unit 160, on the basis of corresponding individual data.

Figure 3:
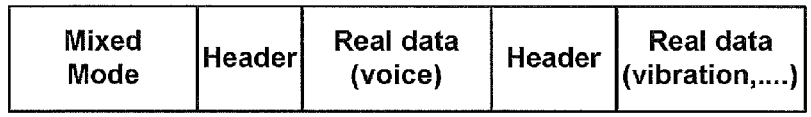
FIGS. 3 and 4 are views showing a file format structure.

Here, if the call connection waiting information contains a plurality of data, it has a file format including a mixed mode field containing a code specifying the type and number of the contained data, a header field containing identification information of real data for identifying each of the plurality of real data, and a real data field containing real data, as shown in FIG. 3.

The real data is digital data such as a voice, vibration, temperature, a color, and the like.

As shown in FIG. 3, the call connection waiting information is constructed in order of the mixed mode field, the header, and the real data, and it is possible to add more real data as is needed by an operator. When a real data is added, a header matching to the real data is also added.

Figure 4:
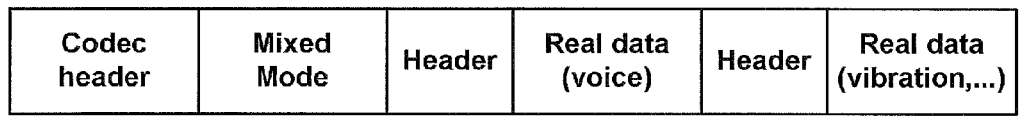

On the other hand, as shown in FIG. 4, the call connection waiting information further contains a codec header field that is added when the mobile communication system performs encoding based on a specific codec.

The codec is a speech codec having a variable speed, such as an adaptive multi-rate (AMR) codec, G.711, G.729, EVRC, or the like.

Figure 5:
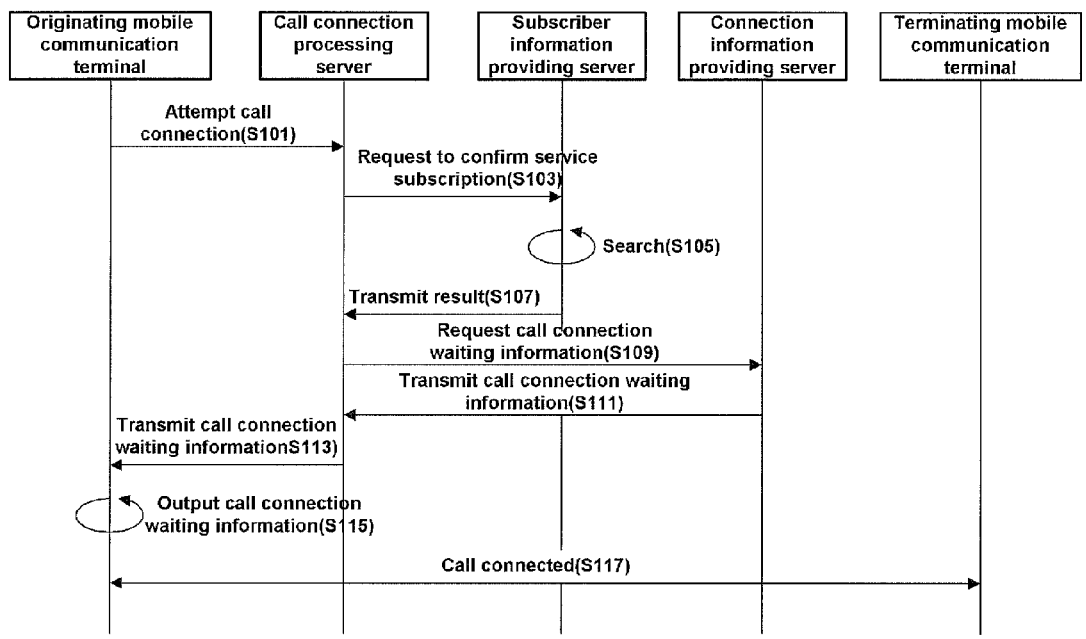
FIG. 5 is a sequence diagram illustrating a method of transmitting data while waiting for call connection according to the present invention.

FIG. 5 is a sequence diagram illustrating a method of transmitting data while waiting for call connection according to the present invention, and a method of transmitting data while the mobile communication system is connecting a call is described as an example.

First, if the mobile communication system (the call connection processing server and the subscriber information providing server of FIG. 5) receives a call connection request from the originating mobile communication terminal 100-a, the mobile communication system searches for service subscription information of the terminating mobile communication terminal 100-b and confirms whether or not the terminating mobile communication terminal is a subscriber of a data transmission service S101 to S107.

As shown in the figure, the subscriber information providing server internally transfers a result of the search to the call connection processing server.

If the terminating mobile communication terminal 100-b is a subscriber of the data transmission service, the mobile communication system requests and receives call connection waiting information containing a plurality of digital data and matching to the terminating mobile communication terminal 100-b from the connection information providing server 400 S109 and S111.

Next, the mobile communication system encodes and transmits the call connection waiting information received from the connection information providing server 400 to the originating mobile communication terminal 100-a S113.

Next, if the originating mobile communication terminal 100-a recognizes that the call connection waiting information contains a plurality of data by confirming the header of the file format of the call connection waiting information received from the mobile communication system, the originating mobile communication terminal 100-a divides the plurality of data and processes each of the divided data S115.

If the terminating mobile communication terminal 100-b accepts the call and call connection is established between the originating mobile communication terminal 100-a and the terminating mobile communication terminal 100-b S117, the mobile communication system terminates transmission of the call connection waiting information.

Figure 6:
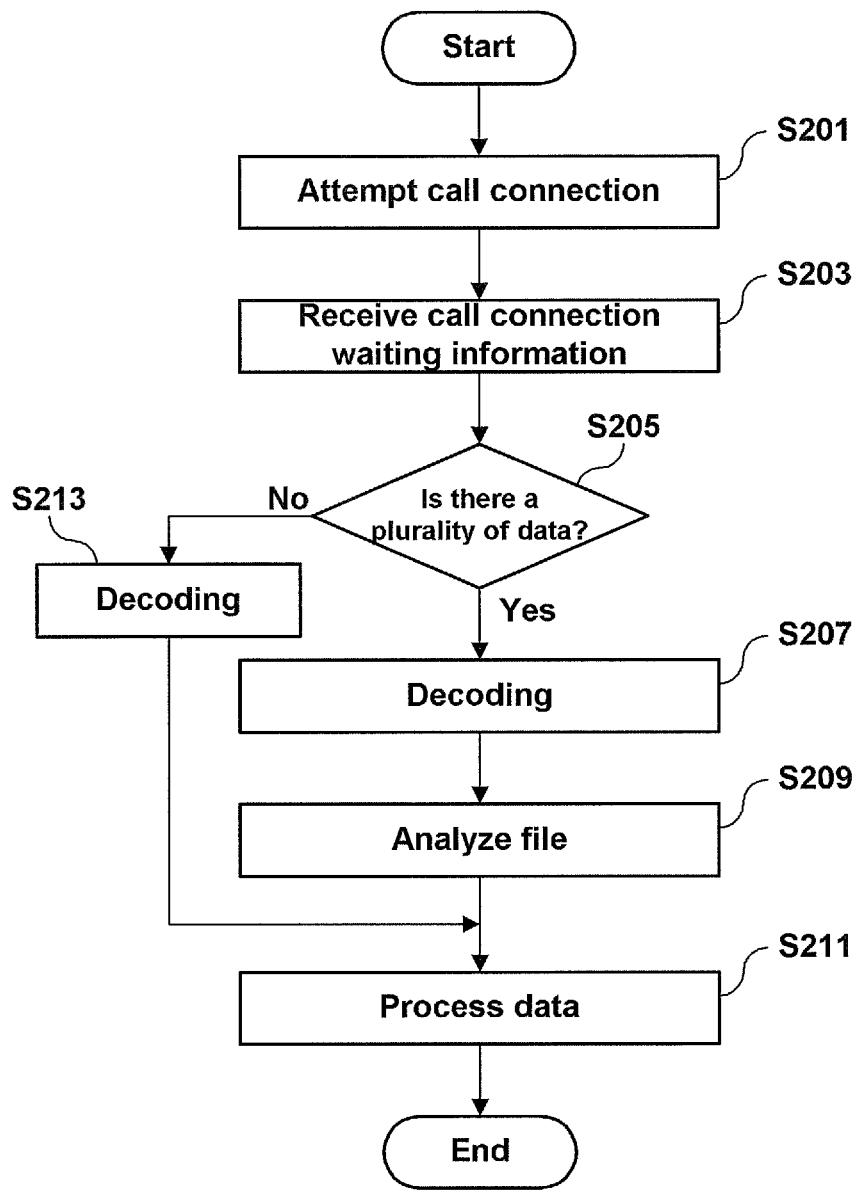
FIG. 6 is a flowchart illustrating a method of executing call connection waiting information according to the present invention.

FIG. 6 is a flowchart illustrating a method of executing call connection waiting information in a mobile communication terminal according to the present invention.

First, if the mobile communication terminal attempts call connection, the mobile communication terminal receives call connection waiting information transmitted from the mobile communication system S201 and S203.

Next, the mobile communication terminal examines the header of the file format of the call connection waiting information and confirms whether or not a preset identification code indicating that the call connection waiting information contains a plurality of data is contained in the header S205.

Here, the call connection waiting information contains a codec header field that is added when the mobile communication system performs encoding based on a specific codec. If a plurality of data is contained in the call connection waiting information, the call connection waiting information contains a mixed mode field containing a code specifying the type and number of the contained data, a header field containing identification information of real data for identifying each of the plurality of real data, and a real data field containing real data.

In step S205, the mobile communication terminal confirms whether or not a preset identification code indicating that the call connection waiting information contains a plurality of data is contained in the header referring to the contents of the codec header field.

If the preset identification code is contained in the header as a result of the confirmation, the mobile communication terminal decodes the call connection waiting information, analyzes the file format of the decoded call connection waiting information, and divides the call connection waiting information into a plurality of data S207 and S209.

In step S209, the mobile communication terminal divides the plurality of data into individual data referring to the contents of the header field.

Next, the mobile communication terminal processes the call connection waiting information divided into a plurality of individual data, on the basis of corresponding individual data S211.

For example, if a voice and vibration are contained in the call connection waiting information as real data, the mobile communication terminal divides the voice and the vibration, and the voice is outputted if the mobile communication terminal is configured to output voices, and the vibration is outputted if the mobile communication terminal is configured to process vibration.

On the other hand, if the preset identification code is not contained in the header as a result of the confirmation in step S205, the mobile communication terminal decodes the call connection waiting information S213 and performs step S211.

Hereinafter, an example of the above-mentioned data transmission service will be described with reference to FIGS. 7 to 13, and the call connection processing server is divided into a terminating call controller and an originating call controller for the convenience of explanation.

In addition, the subscriber information providing server is divided into an originating location register and a terminating location register.

On the other hand, the emotional information call connection waiting information disclosed in FIGS. 7 to 13 has the same meaning as the call connection waiting information described above. However, it will be distinguished from the call connection waiting information for the convenience of explanation.

Figure 7:
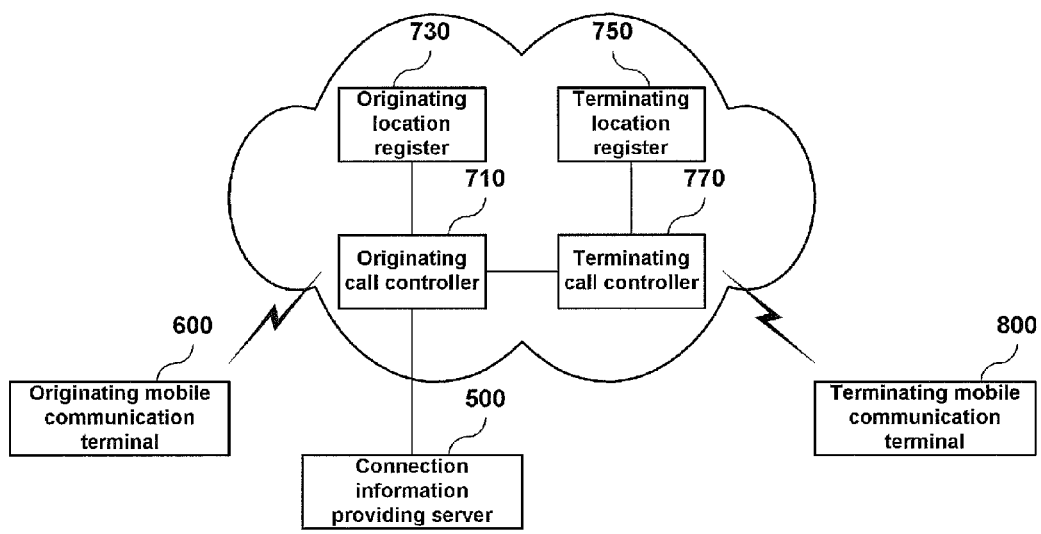
FIG. 7 is a view showing the configuration of a system for providing emotional information call connection waiting information according to the present invention.

FIG. 7 is a view showing the configuration of a system for providing emotional information call connection waiting information according to the present invention.

Describing in further detail, the system for providing emotional information call connection waiting information includes an originating call controller 710, an originating location register 730, a connection information providing server 500, a terminating location register 750, and a terminating call controller 770, and the system may further include an originating mobile communication terminal 600 and a terminating mobile communication terminal 800.

The emotional information call connection waiting information is for providing the originating mobile communication terminal 600 with emotional information, other than a beep sound, music, and a multimedia image, while the originating mobile communication terminal 600 is waiting for call connection with the terminating mobile communication terminal 800. The emotional information call connection waiting information includes emotional information, such as vibration, temperature, a smell, a scent, and the like. Here, the emotional information call connection waiting information has the same meaning as the digital data disclosed in FIGS. 1 to 6.

The originating mobile communication terminal 600 communicates with the originating call controller 710 through a communication network. The communication network is an IP network providing a large-scale data transmission service and a seamless data service through the IP, and the communication network can be an ALL-IP network having an IP network structure which integrates heterogeneous networks based on the IP. Alternatively, the communication network can be any one of Wideband Code Division Multiple Access (WCDMA), Code Division Multiple Access (CDMA), and Global Systems for Mobile Communication (GSM). The originating mobile communication terminal 600 transmits a call request to the originating call controller 710 for call connection with the terminating mobile communication terminal 800. The originating mobile communication terminal 600 receives contents of the emotional information call connection waiting information that can be supported by the originating mobile communication terminal 600 from the originating call controller 710 and executes emotional information call connection waiting information corresponding to the contents.

The originating call controller 710 allocates a wireless channel for call communications between the originating mobile communication terminal 600 and the terminating mobile communication terminal 800. The originating call controller 710 requests additional information of the originating mobile communication terminal 600, such as call block, authentication information, and the like, from the originating location register 730, and requests and receives emotional information call connection waiting information that can be supported by the originating mobile communication terminal 600.

The location register is a Home Subscriber Server (HSS) performing an authentication function, in addition to general functions of a Home Location Register (HLR). The location register includes an originating location register 730 and a terminating location register 750. The originating and terminating location registers 730 and 750 respectively store emotional information call connection waiting information that can be supported by the originating mobile communication terminal 600 and information on an emotional information call connection waiting information service subscribed by the terminating mobile communication terminal 800, in addition to terminal information, subscription information, and location information of subscribers and an authentication function.

The terminating call controller 770 receives the call request transmitted from the originating call controller 710 and performs call connection. In addition, the terminating call controller 770 requests and receives additional information, including location information of the terminating mobile communication terminal 800 and information on the emotional information call connection waiting information service subscribed by the terminating mobile communication terminal 800, from the terminating location register 750. The terminating call controller 770 transmits the received additional information including the information on the emotional information call connection waiting information service subscribed by the terminating mobile communication terminal 800 to the originating call controller 710.

At this point, the originating call controller 710 and the terminating call controller 770 can be configured separately as shown in FIG. 7 or as one body. Accordingly, the originating location register 730 and the terminating location register 750 also can be configured separately or as one body. In addition, the originating and terminating location registers 730 and 750 and the originating and the terminating call controllers 710 and 770 can be configured as one body or separately.

The connection information providing server 500 is connected to the originating call controller 710 in order to provide the originating mobile communication terminal 600 with the emotional information call connection waiting information service. The connection information providing server 500 receives emotional information call connection waiting information that can be supported by the originating mobile communication terminal 600 and information on the emotional information call connection waiting information service subscribed by the terminating mobile communication terminal 800 from the originating call controller 710 and compares the two pieces of information. As a result of the comparison, the connection information providing server 500 extracts contents of the emotional information call connection waiting information that can be supported by the originating mobile communication terminal 600 and transmits the extracted contents to the originating call controller 710.

Figure 8:
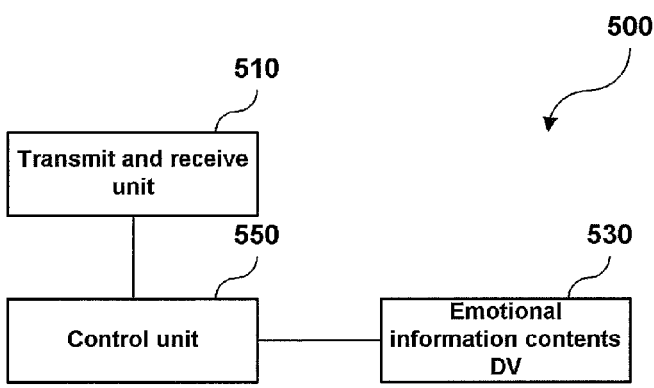
FIG. 8 is a block diagram showing the configuration of a connection information providing server according to the present invention.
Figure 9:
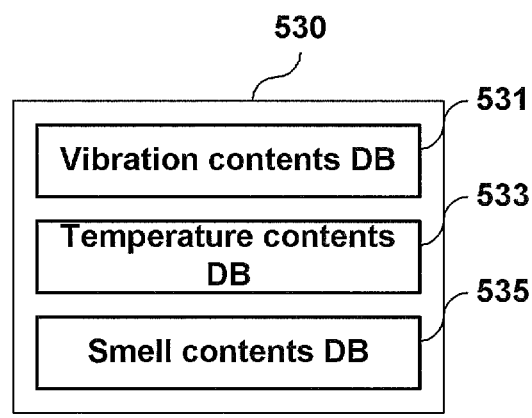
FIG. 9 is a block diagram showing the configuration of an emotional information contents DB according to the present invention.

FIG. 8 is a block diagram showing the configuration of a connection information providing server according to the present invention, and FIG. 9 is a block diagram showing the configuration of an emotional information contents DB according to the present invention.

As shown in the figure, the connection information providing server 500 includes a transmit and receive unit 510, an emotional information contents DB 530, and a control unit 550.

The transmit and receive unit 510 communicates with the originating call controller 710.

The emotional information contents DB 530 stores a plurality of emotional information call connection waiting information contents. The emotional information contents DB 530 includes a vibration contents DB 531 for storing vibration emotional information contents, a temperature contents DB 533 for storing temperature emotional information contents, and a smell contents DB 535 for storing smell emotional information contents. In addition, the emotional information contents DB may also contain various emotional information contents, e.g., tactile emotional information contents allowing a user to feel a sense of touch through the change of materials.

The control unit 550 is a microprocessor for performing general control operations of the connection information providing server 500. The control unit 550 compares the emotional information call connection waiting information that can be supported by the originating mobile communication terminal 600 and the information on the emotional information call connection waiting information service subscribed by the terminating mobile communication terminal 800 received from the originating call controller 710 through the transmit and receive unit 510, and extracts contents of the emotional information call connection waiting information that can be supported by the originating mobile communication terminal 600 from the emotional information contents DB 530. The control unit 550 transmits the contents of the emotional information call connection waiting information that can be supported by the originating mobile communication terminal 600 to the originating mobile communication terminal 600 through the transmit and receive unit 510.

Figure 10:
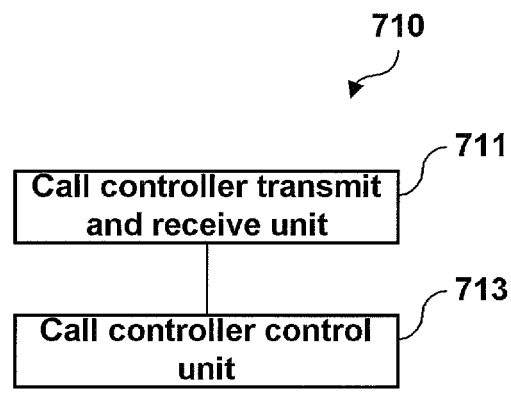
FIG. 10 is a block diagram showing the configuration of an originating call controller according to the present invention.

FIG. 10 is a block diagram showing the configuration of an originating call controller of FIG. 7.

As shown in the figure, the originating call controller 710 includes a call controller transmit and receive unit 711 and a call controller control unit 713.

The call controller transmit and receive unit 711 communicates with the originating mobile communication terminal 600, the originating location register 730, the connection information providing server 500, and the terminating call controller 770, receives a call request of the originating mobile communication terminal 600 attempting call connection with the terminating mobile communication terminal 800 from the originating mobile communication terminal 600, and transmits the call request to the terminating call controller 770.

The call controller control unit 713 is a microprocessor for performing general control operations of the originating call controller 710, which is a component for performing call and session processing. The call controller control unit 713 receives information on the emotional information call connection waiting information service subscribed by the terminating mobile communication terminal 800 and emotional information call connection waiting information that can be supported by the originating mobile communication terminal 600 through the call controller transmit and receive unit 711. The call controller control unit 713 transmits the information on the emotional information call connection waiting information service subscribed by the terminating mobile communication terminal 800 and the emotional information call connection waiting information that can be supported by the originating mobile communication terminal 600 received through the call controller transmit and receive unit 711 to the connection information providing server 500.

The call controller control unit 713 receives contents of the emotional information call connection waiting information that can be supported by the originating mobile communication terminal 600 extracted and transmitted by the connection information providing server 500 through the call controller transmit and receive unit 711 and transmits the received contents to the originating mobile communication terminal 600.

Figure 11:
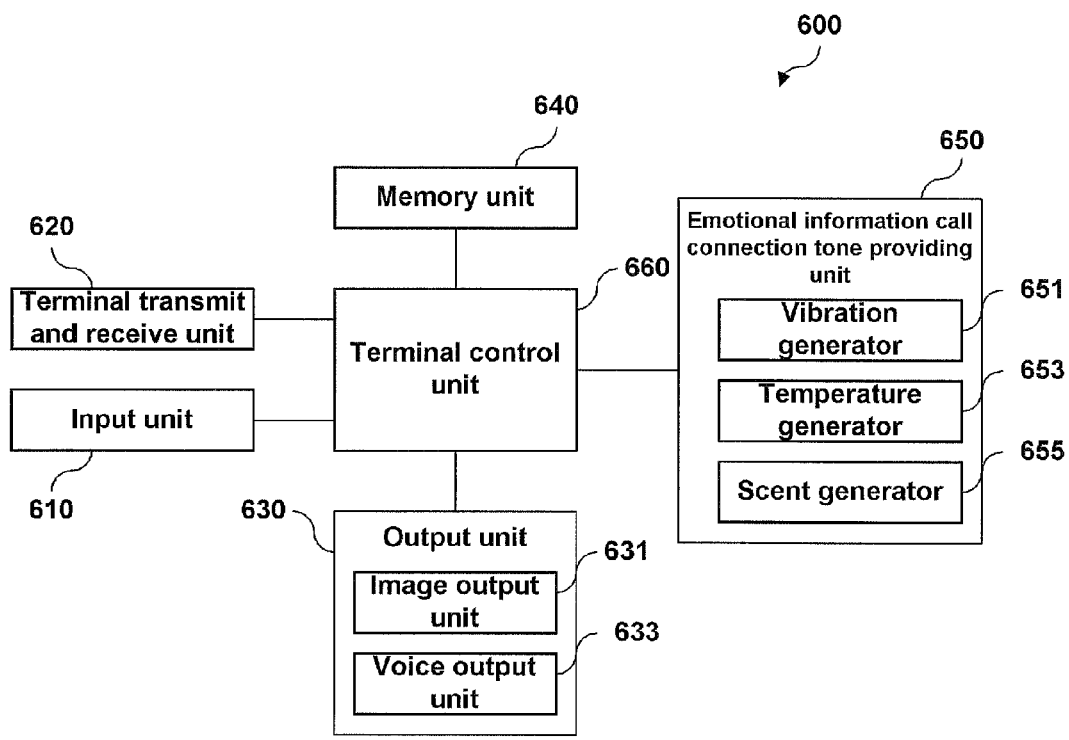
FIG. 11 is a block diagram showing the configuration of an originating mobile communication terminal according to the present invention.

FIG. 11 is a block diagram showing the configuration of an originating mobile communication terminal of FIG. 7.

As shown in the figure, the originating mobile communication terminal 600 includes an input unit 610, a terminal transmit and receive unit 620, an output unit 630, a memory unit 640, an emotional information call connection waiting information providing unit 650, and a terminal control unit 660.

The input unit 610 provides a plurality of keys for handling the originating mobile communication terminal 600 and generates a selection signal corresponding to a key selection of a user of the originating mobile communication terminal 600. The user of the originating mobile communication terminal 600 issues a call request for attempting call connection with the terminating mobile communication terminal 800 by inputting an address of the terminating mobile communication terminal 800 and pressing a call button through the input unit 610. A pointing device, such as a keypad or a touchpad, or an input device, such as a touch screen or the like, can be used as an input unit 610.

The terminal transmit and receive unit 620 communicates with the originating call controller 710 under the control of the terminal control unit 660. The terminal transmit and receive unit 620 receives contents of the emotional information call connection waiting information that can be supported by the originating mobile communication terminal 600.

The output unit 630 includes an image output unit 631 for outputting various image contents and a voice output unit 633 for outputting voice contents under the control of the terminal control unit 660. An LCD or a touch screen can be used as an image output unit 631, and a speaker can be used as a voice output unit 633. The touch screen performs functions of both a display device and an input device.

The memory unit 640 stores application programs needed to control operations of the originating mobile communication terminal 600 under the control of the terminal control unit 660, and data generated while executing the programs, and the memory unit 640 is constructed with one or more volatile memory elements and non-volatile memory elements.

The emotional information call connection waiting information providing unit 650 executes emotional information call connection waiting information corresponding to the emotional information call connection waiting information contents received from the terminal transmit and receive unit 620 under the control of the terminal control unit 660, and includes a vibration generator 651, a temperature generator 653, and a scent generator 655.

The vibration generator 651 is a vibration motor for generating vibration corresponding to vibration emotional information contents.

The temperature generator 653 sets a temperature corresponding to temperature emotional information contents. The temperature generator 653 compares current temperature with the temperature of the temperature emotional information contents and sets a temperature to make the temperature of the originating mobile communication terminal 600 be equal to the temperature emotional information contents.

The scent generator 655 generates various kinds of scents corresponding to smell emotional information contents, and a user of the originating mobile communication terminal 600 can arbitrarily set a type and strength of a scent.

The terminal control unit 660 is a microprocessor for performing general control operations of the originating mobile communication terminal 600. The terminal control unit 660 transmits a call request for attempting call connection with a terminating mobile communication terminal 800 corresponding to an address inputted through the input unit 610 to the originating call controller 710, receives emotional information call connection waiting information contents from the originating call controller 710, and executes the received contents.

Figure 12:
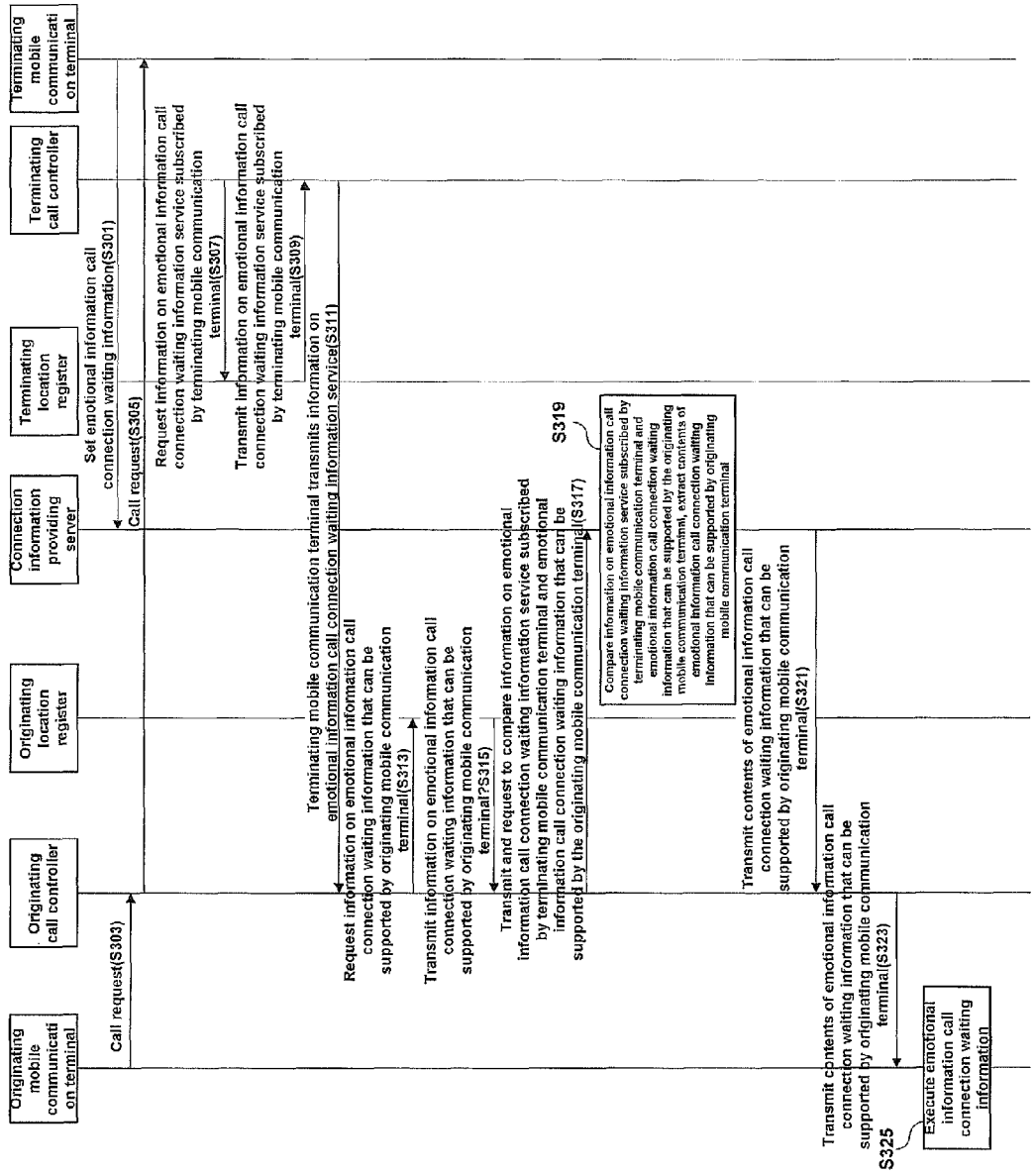
FIG. 12 is a sequence diagram illustrating a method of providing emotional information call connection waiting information according to the present invention.
Figure 13:
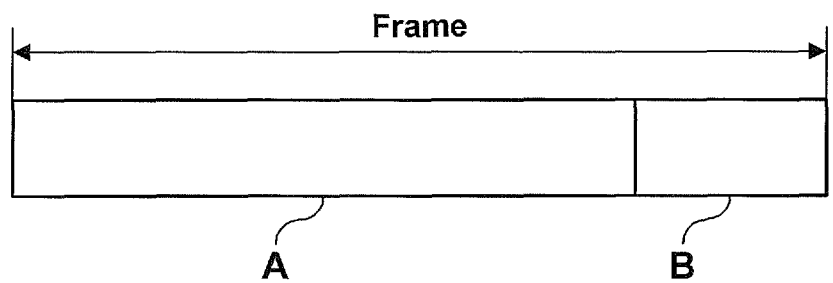
FIG. 13 is a view showing the structure of an AMR voice codec containing emotional information call connection waiting information contents according to the present invention.

FIG. 12 is a sequence diagram illustrating a method of providing emotional information call connection waiting information according to the present invention, and FIG. 13 is a view showing the structure of an AMR voice codec containing emotional information call connection waiting information contents according to the present invention.

First, in order to provide the originating mobile communication terminal 600 with emotional information call connection waiting information, the terminating mobile communication terminal 800 sets an emotional information call connection waiting information service to the connection information providing server 500 in response to a request from the user S301.

Next, the originating mobile communication terminal 600 transmits a call request for attempting call connection with the terminating mobile communication terminal 800 to the originating call controller 710 S303. A user of the originating mobile communication terminal 600 may attempt the call connection using the input unit 610.

The originating call controller 710 transmits the call request of the originating mobile communication terminal 600 to the terminating call controller 770 S305.

The terminating call controller 770 requests information on the emotional information call connection waiting information service subscribed by the terminating mobile communication terminal 800 from the terminating location register 750 S307, and the terminating call controller 770 receives the information on the emotional information call connection waiting information service subscribed by the terminating mobile communication terminal 800 from the terminating location register 750 S309.

Next, the terminating call controller 770 transmits the received information on the emotional information call connection waiting information service subscribed by the terminating mobile communication terminal 800 to the originating call controller 710 S311.

The originating call controller 710 requests emotional information call connection waiting information that can be supported by the originating mobile communication terminal 600 from the originating location register 730 S313 and receives the emotional information call connection waiting information that can be supported by the originating mobile communication terminal 600 from the originating location register 730 S315.

The originating call controller 710 transmits the information on the emotional information call connection waiting information service subscribed by the terminating mobile communication terminal 800 and the emotional information call connection waiting information that can be supported by the originating mobile communication terminal 600 to the connection information providing server 500 S317.

The connection information providing server 500 compares the information on the emotional information call connection waiting information service subscribed by the terminating mobile communication terminal 800 and the emotional information call connection waiting information that can be supported by the originating mobile communication terminal 600, and extracts contents of the emotional information call connection waiting information that can be supported by the originating mobile communication terminal 600 S319.

The connection information providing server 500 transmits the contents of the emotional information call connection waiting information that can be supported by the originating mobile communication terminal 600 to the originating call controller 710 S321.

The originating call controller 710 transmits the contents of the emotional information call connection waiting information that can be supported by the originating mobile communication terminal 600 to the originating mobile communication terminal 600 S323.

The originating call controller 710 can transmit the emotional information call connection waiting information contents to the originating mobile communication terminal 600 using both circuit switching and packet switching. In addition, a method selected from an USSD protocol and an UUS service can be used as a method for transmitting a message containing the emotional information call connection waiting information contents. In addition, it is possible to divide an Adaptive Multi-Rate (AMR) voice codec as shown in FIG. 13 to contain voice information A in one part of a frame and emotional information call connection waiting information contents B in the other part of the frame, and transmit the emotional information call connection waiting information contents to the originating mobile communication terminal 600.

For example, if the entire frame is 10 ms, the voice information A may be 7 ms, and the emotional information call connection waiting information contents B may be 3 ms, or if the entire frame is 20 ms, the voice information A may be 14 ms, and the emotional information call connection waiting information contents B may be 6 ms.

Table 1 shows emotional information contents stored in the emotional information contents DB 530. Referring to Table 1, the emotional information contents is stored in the emotional information contents DB 530 in the form of a TLV including a type, a length, and real data. TLV represents a type, a length, and a value.

The type defines what the emotional information call connection waiting information is, and the counter is used not to mix up the sequence of the emotional information call connection waiting information contents or to prevent duplication of the contents. The ID is a kind of code information agreed among the terminals in advance to inform what kind of vibration and temperature they actually are. Accordingly, it is possible to transmit the emotional information call connection waiting information contents by transmitting a code agreed in advance to the originating mobile communication terminal 600, without transmitting real data.

TABLE 1

| Type | Counter | ID | Length | Data |
|---|---|---|---|---|
| 1. Vibration<br>2. Temperature<br>3. Smell<br>4. | A counter for preventing duplication or maintaining sequence | Detailed contents of a specific type | Length of data | Real data of emotional information call connection waiting information contents |

For example, if the emotional information call connection waiting information service subscribed by the terminating mobile communication terminal 800 is set to detailed contents corresponding to ID 8 of a vibration type, and a code is agreed in advance between the terminating mobile communication terminal 800 and the originating mobile communication terminal 600, the connection information providing server 500 transmits a code '1,8' to the originating mobile communication terminal 600. The originating mobile communication terminal 600 executes emotional information call connection waiting information corresponding to ID 8 of a vibration type as is agreed in the received code '1,8'.

In the same manner, if the terminating mobile communication terminal 800 sets emotional information call connection waiting information having detailed contents of ID 3 of a smell type, and a code is agreed in advance between the terminating mobile communication terminal 800 and the originating mobile communication terminal 600, the originating mobile communication terminal 600 receives a code '3,3' and generates a scent as is agreed in the code based on the detailed contents contained in the ID.

On the other hand, if a code is not agreed between the terminating mobile communication terminal 800 and the originating mobile communication terminal 600, the connection information providing server 500 transmits real data corresponding to the emotional information call connection waiting information contents set by the terminating mobile communication terminal 800 to the originating mobile communication terminal 600.

The originating mobile communication terminal 600 executes the emotional information call connection waiting information corresponding to the contents of the emotional information call connection waiting information that can be supported by the originating mobile communication terminal 600 S325.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

As describe above, the method and system for transmitting digital data while waiting for call connection and the mobile communication terminal for the same according to the present invention are appropriate when call connection waiting information containing various types of information highly needs to be provided to the mobile communication terminal while connecting a call without separately using an additional protocol.

Furthermore, in the present invention, an originating terminal user can be provided with emotional information call connection waiting information set by a terminating terminal user. Therefore, the present is appropriate for developing emotional information call connection waiting information contents fulfilling desire of expression of the terminating terminal user.

The invention claimed is:

1. A data transmission system comprising:

a mobile communication system having a subscriber information providing server including service subscription information, for searching for service subscription information of a terminating mobile communication terminal to which an originating mobile communication terminal attempts call connection and confirming whether or not the terminating mobile communication terminal is a subscriber of a data transmission service, when the originating mobile communication terminal attempts call connection, and requesting and receiving call connection waiting information in a file format having a header field containing a plurality of digital data including an identification code which is matched to corresponding identification code information in the terminating mobile communication terminal from a connection information providing server and encoding and transmitting the call connection waiting information to the originating mobile communication terminal, if the terminating mobile communication terminal is the subscriber of the data transmission service;

the connection information providing server for storing and managing the call connection waiting information transmitted from the terminating mobile communication terminal to the originating mobile communication terminal in response to a request from the mobile communication system; and wherein the originating mobile communication terminal decodes the call connection waiting information, analyzes the file format of the decoded call connection waiting information and divides the call connection waiting information into a plurality of data comprising a mixed mode field containing a code specifying a type and number of the contained data, a header field containing identification information of real data for identifying each of a plurality of real data, and a real data field containing real data for processing the identified real data consisting of digital data corresponding to data selected from the group consisting of voice, vibration, temperature, smell and color.

2. The system according to claim 1, wherein if the originating mobile communication terminal attempts voice call connection, the call connection processing server changes a corresponding traffic class to allow transmission of the call connection waiting information containing a plurality of data, and if transmission of the call connection waiting information is completed, the call connection processing server returns to a previous state to continue transmitting voices.

3. A mobile communication terminal connected to a mobile communication system, for receiving and processing call connection waiting information in a file format having a header field containing a plurality of digital data including an identification code transmitted from the mobile communication system while connecting a call from the mobile communication terminal to a terminating mobile communication terminal, the mobile communication terminal comprising:

a decoder for confirming whether or not a preset identification code exists in the header of the file format, if the call connection waiting information is received from the terminating mobile communication terminal in the mobile communication system, and decoding the call connection waiting information and transferring the decoded call connection waiting information to a file analyzing unit when the preset identification code is contained in the header as a result of the confirmation;

the file analyzing unit for analyzing the file format of the call connection waiting information transmitted from the decoder, dividing the call connection waiting information into a plurality of data comprising a mixed mode field containing a code specifying a type and number of the contained data, a header field containing identification information of real data for identifying each of a plurality of real data, and a real data field containing real data consisting of digital data corresponding to data selected from the group consisting of voice, vibration, temperature, smell and color, and transfers the data to a data processing unit to implement the data on the mobile communication terminal; and the data processing unit for processing the call connection waiting information.

4. The mobile communication terminal according to claim 3, wherein the call connection waiting information further contains a codec header field that is added when the mobile communication system performs encoding based on a specific codec.

5. The mobile communication terminal according to claim 4, wherein the codec is a speech codec having a variable speed.

6. A method for executing call connection waiting information in a file format having a header field containing a plurality of digital data including an identification code while connecting a call from an originating mobile communication terminal to a terminating mobile communication terminal in a mobile communication system, the method comprising the steps of:

a) allowing the originating mobile communication terminal to receive the call connection waiting information transmitted from the mobile communication system, when the mobile communication terminal attempts call connection;

b) allowing the originating mobile communication terminal to examine the header in the file format of the call connection waiting information for confirming whether or not a preset identification code exists in the header to confirm that the terminating mobile communication terminal is a subscriber of a data transmission service in the mobile communication system;

c) allowing the mobile communication terminal to decode the call connection waiting information, analyze the file format of the decoded call connection waiting information, and divide the call connection waiting information into a plurality of data comprising a mixed mode field containing a code specifying a type and number of the contained data, a header field containing identification information of real data for identifying each of a plurality of real data, and a real data field containing real data consisting of digital data corresponding to data selected from the group consisting of voice, vibration, temperature, smell and color, when the identification code contained in the header is confirmed to exist; and d) allowing the mobile communication terminal to process the call connection waiting information.

7. The method according to claim 6, wherein the call connection waiting information further contains a codec header field that is added when the mobile communication system performs encoding based on a specific codec, and in step b), the mobile communication terminal confirms whether or not the preset identification code indicating that the call connection waiting information contains a plurality of data is contained in the header referring to the contents of the codec header field.

8. A connection information providing server comprising:

a transmit and receive unit for communicating with an originating call controller;

an emotional information contents database ("DB") for storing a plurality of emotional information call connection waiting information contents; and a control unit for receiving emotional information call connection waiting information that can be supported by an originating mobile communication terminal and information on an emotional information call connection waiting information service subscribed by a terminating mobile communication terminal through the transmit and receive unit, comparing the received emotional information call connection waiting information and information on an emotional information call connection waiting information service, extracting contents of the emotional information call connection waiting information that can be supported by the originating mobile communication terminal from the emotional information contents DB through the comparison, and transmitting the extracted contents to the originating call controller through the transmit and receive unit;

wherein the originating mobile communication terminal decodes the call connection waiting information, analyzes the file format of the decoded call connection waiting information and divides the call connection waiting information into a plurality of data comprising a mixed mode field containing a code specifying a type and number of the contained data, a header field containing identification information of real data for identifying each of a plurality of real data, and a real data field containing real data for processing the identified real data consisting of digital data corresponding to data selected from the group consisting of voice, vibration, temperature, smell and color.

9. The server according to claim 8, wherein the emotional information contents DB includes a vibration contents DB for storing vibration emotional information contents, a temperature contents DB for storing temperature emotional information contents, and a smell contents DB for storing smell emotional information contents.

10. The server according to claim 8, wherein the originating call controller includes:

a call controller transmit and receive unit for communicating with the originating mobile communication terminal, an originating location register, a connection information providing server, and a terminating call controller, receiving a call request for attempting call connection with the terminating mobile communication terminal from the originating mobile communication terminal, and transmitting the call request to the terminating call controller; and a call controller control unit for receiving information on the emotional information call connection waiting information service subscribed by the terminating mobile communication terminal from the terminating call controller, requesting and receiving emotional information call connection waiting information that can be supported by the originating mobile communication terminal from the originating location register, transmitting the emotional information call connection waiting information that can be supported by the originating mobile communication terminal and the information on the emotional information call connection waiting information service subscribed by the terminating mobile communication terminal to the connection information providing server through the call controller transmit and receive unit, and transmitting contents of the emotional information call connection waiting information that can be supported by the originating mobile communication terminal received from the connection information providing server through the transmit and receive unit to the originating mobile communication terminal.

11. The server according to claim 8, wherein the originating mobile communication terminal includes:
an input unit for receiving a user's selection signal;
a terminal transmit and receive unit for communicating with the originating call controller;
an output unit for outputting images and voices received through the terminal transmit and receive unit;
a memory unit for storing application programs and data;
an emotional information call connection waiting information providing unit for executing emotional information call connection waiting information corresponding to the contents of the emotional information call connection waiting information received through the terminal transmit and receive unit; and
a terminal control unit for transmitting a call request for attempting call connection with the terminating mobile communication terminal to the originating call controller through the terminal transmit and receive unit, receiving the emotional information call connection waiting information contents from the originating call controller, and executing emotional information call connection waiting information corresponding to the emotional information call connection waiting information contents received through the terminal transmit and receive unit.

12. A method for providing emotional information call connection waiting information, the method comprising:
a receiving step of allowing a connection information providing server to receive information on an emotional information call connection waiting information service subscribed by a terminating mobile communication terminal and emotional information call connection waiting information that can be supported by an originating mobile communication terminal from an originating call controller;
a comparing step of allowing the connection information providing server to compare the information on the emotional information call connection waiting information service subscribed by the terminating mobile communication terminal and the emotional information call connection waiting information that can be supported by the originating mobile communication terminal;
an extracting step of allowing the connection information providing server to extract contents of the emotional information call connection waiting information that can be supported by the originating mobile communication terminal from an emotional information contents DB through the comparing step; and
a transmitting step of allowing the connection information providing server to transmit the extracted emotional information call connection waiting information contents to the originating call controller;
wherein the originating mobile communication terminal decodes the call connection waiting information, analyzes the file format of the decoded call connection waiting information and divides the call connection waiting information into a plurality of data comprising a mixed mode field containing a code specifying a type and number of the contained data, a header field containing identification information of real data for identifying each of a plurality of real data, and a real data field containing real data for processing the identified real data consisting of digital data corresponding to data selected from the group consisting of voice, vibration, temperature, smell and color.

13. The method according to claim 12, further comprising a setting step of allowing the connection information providing server to set the emotional information call connection waiting information providing service of the terminating mobile communication terminal, before the receiving step.

14. The method according to claim 12, wherein the emotional information contents are either a code agreed with the terminating mobile communication terminal in advance or a data containing emotional information.

15. The method according to claim 14, wherein the transmitting step transmits the emotional information call connection waiting information contents to the originating mobile communication terminal through circuit switching and packet switching.

16. The method according to claim 14, wherein the transmitting step transmits the emotional information call connection waiting information contents to the originating mobile communication terminal through a message transmitted in a method selected among USSD, UUS, and SMS.

17. The method according to claim 14, wherein the transmitting step transmits the emotional information call connection waiting information contents to the originating mobile communication terminal through an AMR voice codec containing the emotional information contents.

* * * * *